United States Patent
Bailey

(10) Patent No.: US 10,671,993 B2
(45) Date of Patent: Jun. 2, 2020

(54) LOCATION-BASED MOBILE ACCESS DEVICE CONFIGURATION SYSTEM AND METHOD

(71) Applicant: Visa International Service Association, San Francisco, CA (US)

(72) Inventor: Keith Bailey, Orem, UT (US)

(73) Assignee: Visa International Service Association, San Francisco, CA (US)

( * ) Notice: Subject to any disclaimer, the term of this patent is extended or adjusted under 35 U.S.C. 154(b) by 1377 days.

(21) Appl. No.: 14/567,390

(22) Filed: Dec. 11, 2014

(65) Prior Publication Data

US 2015/0161586 A1 Jun. 11, 2015

Related U.S. Application Data

(60) Provisional application No. 61/914,873, filed on Dec. 11, 2013.

(51) Int. Cl.
*G06Q 20/32* (2012.01)
*G06Q 20/40* (2012.01)
*G06Q 20/20* (2012.01)

(52) U.S. Cl.
CPC ....... *G06Q 20/3224* (2013.01); *G06Q 20/202* (2013.01); *G06Q 20/405* (2013.01)

(58) Field of Classification Search
CPC ................................................ G06Q 20/3224
See application file for complete search history.

(56) References Cited

U.S. PATENT DOCUMENTS

| | | | |
|---|---|---|---|
| 7,831,246 B1 * | 11/2010 | Smith | G06Q 20/40 705/44 |
| 7,945,494 B2 | 5/2011 | Williams | |
| 8,214,269 B2 | 7/2012 | Wilmes | |
| 8,315,947 B2 | 11/2012 | Aaron | |
| 8,341,029 B1 | 12/2012 | Ramalingam | |

(Continued)

OTHER PUBLICATIONS

Zhang et al., Location-based Authentication and Authorization Using Smart Phones, 2012 IEEE 11th International Conference on Trust, Security and Privacy in Computing and Communications, IEEE, all pages. (Year: 2012).*

(Continued)

*Primary Examiner* — Jacob C. Coppola
(74) *Attorney, Agent, or Firm* — Kilpatrick Townsend & Stockton LLP

(57) ABSTRACT

Embodiments of the invention are directed to systems, apparatus, and methods for providing location-specific authentication at a mobile access device. In some embodiments, a mobile access device (e.g., a mobile POS terminal such as a smart phone) can receive a request to initiate a transaction. The mobile access device can determine a current location of the mobile access device, and can select an authentication process based upon the determined location. The selected authentication process can then be performed by the mobile access device. In some embodiments, when the current location is a first location, the selected authentication process can include requesting authentication data before authorization of the transaction and, when the current location is the second location, the selected authentication process can include requesting the authentication data after authorization of the transaction.

12 Claims, 7 Drawing Sheets

(56) References Cited

U.S. PATENT DOCUMENTS

| | | | |
|---|---|---|---|
| 8,577,731 B1* | 11/2013 | Cope | G06Q 20/3224 705/17 |
| 8,732,042 B2 | 5/2014 | Hammad | |
| 2006/0111125 A1* | 5/2006 | Karaoguz | H04L 63/083 455/456.2 |
| 2008/0040276 A1* | 2/2008 | Hammad | G06Q 20/085 705/44 |
| 2009/0112757 A1 | 4/2009 | Hammad | |
| 2011/0047075 A1 | 2/2011 | Fourez | |
| 2011/0145915 A1* | 6/2011 | Gnech | G06F 21/31 726/19 |
| 2011/0225091 A1 | 9/2011 | Plastina | |
| 2014/0289821 A1* | 9/2014 | Wilson | G06Q 20/42 726/5 |

OTHER PUBLICATIONS

Android mobile device application, "Tipping Bird: World Tip Guide," Jul. 17, 2011, [online], [retrieved on Dec. 16, 2014], retrieved from Google Play Store, using internet <URL: https://play.google.com/store/apps/details?id=com.jeremydw.tippingbird&hl=en>, 2 pages.

\* cited by examiner

| COMPUTER READABLE MEDIUM 106(b) |  |
|---|---|
| AUTHENTICATION RULES 302 | |
| LOCATION 302(a) | AUTHENTICATION PROCESS 302(b) |
| Location A | Prior to Authorization |
| Location B | After Authorization |
| Location C | After Authorization |
| Location D | Prior to Authorization |
| Location E | After Authorization |
| Location F | Prior to Authorization |
| Location G | After Authorization |

LOCATION-BASED MOBILE ACCESS DEVICE CONFIGURATION SYSTEM AND METHOD

CROSS-REFERENCES TO RELATED APPLICATIONS

The present application is a non-provisional application of and claims priority to U.S. Provisional Application No. 61/914,873, filed on Dec. 11, 2013, the entire contents of which are herein incorporated by reference for all purposes.

BACKGROUND

Mobile merchants are an increasingly prevalent phenomenon. For example, merchants such as mobile food providers (e.g., food trucks, food deliver services, etc.), home service providers (e.g., electricians, carpenters, floor installers, plumbers, housekeepers, handymen, etc.), transportation service providers (e.g., taxis, limousines, tow trucks, etc.), door-to-door salesman, flea market vendors, and the like, may engage in payment transactions at different locations. Since many customers prefer to conduct purchases using credit cards, debit cards, and the like, mobile merchants may utilize mobile access devices (e.g., mobile POS terminals) to accept these forms of payment.

However, the rules governing such payment transactions may vary from location to location. For example, the California Song-Beverly Credit Card Act restricts how merchants can accept and utilize certain types of personal information (e.g., ZIP codes, email addresses, etc.) in the context of an electronic payment transaction. To illustrate, in California, a merchant may not in some instances be permitted to request a customer ZIP code for authentication of an electronic payment transaction until after the transaction has been authorized by the issuer of the customer's account or by an entity that authorizes transactions on behalf of the issuer. In other jurisdictions, however, a merchant may be permitted to request the ZIP code prior to submitting the transaction for authorization.

Mobile merchants may be unaware of the particular regional authentication requirements that apply at a given transaction location. In instances where a mobile merchant is aware of the local requirements, the merchant may be unable to modify the authentication processes performed by their mobile access device. Moreover, even if the merchant's mobile access device is configured to allow for modifications to existing authentication processes, such manual adjustments can be time-consuming and may involve an inefficient use of an access device's processing resources and battery life.

Embodiments of the invention address these and other problems.

BRIEF SUMMARY

Embodiments of the invention are directed to systems, apparatus, and methods for providing location-specific authentication at a mobile access device.

One embodiment of the invention is directed to a method. The method may comprise receiving, by a mobile access device, a request to initiate a transaction. The mobile access device can determine a current location of the mobile access device, and can select an authentication process based upon the determined current location of the mobile access device. The selected authentication process can then be performed by the mobile access device.

Another embodiment of the invention is directed to a mobile access device that may comprise a processor and a non-transitory computer-readable medium coupled to the processor. The non-transitory computer-readable medium can include code executable by a processor for performing a method. The method may comprise receiving a request to initiate a transaction, determining a current location of the mobile access device, selecting an authentication process based upon the determined current location of the mobile access device, and performing the selected authentication process.

These and other embodiments of the invention are described in detail below.

BRIEF DESCRIPTION OF THE DRAWINGS

FIG. 3 illustrates an exemplary data table containing location-specific authentication rules in accordance with some embodiments.

DEFINITIONS

Figure 1:
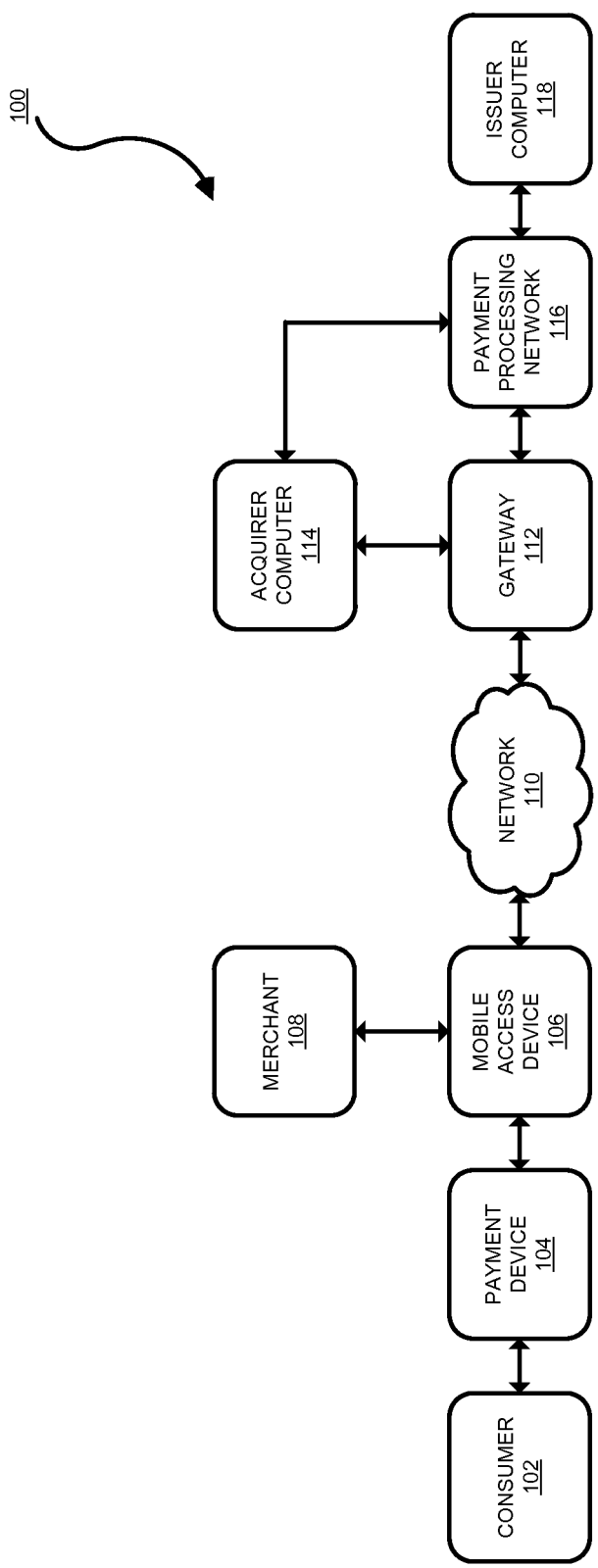
FIG. 1 illustrates a block diagram of an exemplary payment processing system in accordance with some embodiments.

Prior to further describing embodiments of the invention, a description of some terms may be helpful in understanding embodiments of the invention.

A "mobile access device" may include any device that can be used to receive and/or retrieve information from a payment device in the context of an electronic payment transaction. A mobile access device may be in any suitable form. Exemplary mobile access devices include, but are not limited to, mobile point of sale (POS) terminals, mobile phones (e.g., smart phones), PDAs, laptop computers, net books, tablet computers, media players, handheld specialized readers, wearable electronics (e.g., smart watches), and the like. A mobile access device may use any suitable contact or contactless mode of operation to send or receive data from, or associated with, a payment device. In some embodiments, where a mobile access device comprises a mobile POS terminal, any suitable POS terminal may be used and may include a reader, a processor, and a computer-readable medium. Exemplary readers can include radio frequency (RF) antennas, optical scanners, bar code readers, QR code readers, and/or magnetic stripe readers configured to interact with a payment device.

A "processor" may include hardware within a mobile access device (or other computing device) that carries out instructions embodied as code in a computer-readable medium (e.g., a non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

A "location" may include an indication of geographic location including, but not limited to, geographic coordinates, street address, city, state, country, and the like.

An "authentication process" may include any process suitable for verifying the identity of an account holder, payment device, or other aspect of an electronic payment transaction. "Authentication data" may include any information suitable for verifying the identify of an account holder, payment device, or other aspect of an electronic payment transaction. Exemplary authentication data may include, but is not limited to, a Zone Improvement Plan (ZIP) code, billing address, email address, phone number, Personal Identification Number (PIN), signature, password, passphrase, CVV code, date of birth, and biometric data. In some embodiments, an authentication process can include receiving an identifier of an account and/or account holder along with authentication data, and comparing the authentication data to stored information previously associated with the account and/or account holder.

An "authorization request message" may include an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a consumer payment device or payment account. An authorization request message may also comprise additional data elements corresponding to identification information including, by way of example only: a service code, a CVV/iCVV (card verification value), a dCVV (dynamic card verification value), a cryptogram (e.g., a unique cryptographic value for the transaction), an expiration date, etc. An authorization request message may also comprise transaction information, such as any information associated with a current transaction, such as the transaction amount, merchant identifier (e.g., MVV), merchant location, merchant category code, etc., as well as any other information that may be utilized in determining whether to authorize a transaction.

An "authorization response message" may include an electronic message reply to an authorization request message generated by an issuing financial institution or a payment processing network. An authorization response message according to some embodiments may comply with ISO 8583. An authorization response message may include, by way of example only, one or more of the following status indicators: Approval—transaction was approved; Decline—transaction was not approved; or Call Center—response pending more information, merchant must call the toll-free authorization phone number. The authorization may also include "identification information" as described above. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As described below, in some embodiments, a payment processing network may generate or forward the authorization response message to a gateway, merchant, or an acquirer of the merchant.

DETAILED DESCRIPTION

Embodiments of the invention are directed to systems, apparatus, and methods for providing location-specific authentication at a mobile access device. A mobile access device (e.g., a mobile POS terminal) can store or otherwise have access to authentication requirements for various locations. When an electronic payment transaction is initiated at the mobile access device, it can determine its current location (e.g., using GPS or other location-determination technology), select the appropriate authentication process based on the determined current location, and then perform the selected authentication process. In some embodiments, the selected authentication process may determine whether authentication information is requested from a consumer involved in the transaction before or after authorization of the transaction is provided by the issuer of the account used to conduct the transaction.

As an illustration, a consumer may initiate a transaction with a mobile merchant by presenting a payment device (e.g., a credit card). The mobile merchant may then swipe or otherwise cause the payment device to interact with a mobile access device (e.g., a mobile POS terminal). The mobile access device may determine its current location (e.g., geographic coordinates), and may then access a data table (e.g., stored internally or remotely) to identify the permitted authentication processes for the determined current location. In this illustration, local requirements may allow the mobile merchant to request authentication information from the consumer (e.g., a billing ZIP code) before receiving authorization of the transaction from the issuer of the account associated with the payment device. The authentication information can be provided to the mobile access device (e.g., by the consumer), which may then generate an authorization request message that is transmitted to the account issuer via a payment processing network. If the issuer or payment processing network is to perform authentication of the consumer, the authorization request message may also include the authentication information provided by the consumer. If the consumer is authenticated and if the issuer authorizes the transaction (e.g., if the account contains sufficient funds to cover the purchase amount), the issuer may return an authorization response message indicating that the transaction is approved. The authorization response message may be routed through the payment processing network back to the mobile access device. Upon receiving the authorization response message, the mobile merchant merchant can release the purchased goods to the consumer. Alternatively, if the authorization response message indicates that the consumer is not authenticated or that the issuer does not authorize the transaction, the transaction can be canceled.

As another illustration, the mobile access device may instead determine based on the current location that local requirements do not allow for the authentication information to be requested from the consumer until after the transaction has been authorized. In this illustration, the mobile access device may first transmit the authorization request message to the account issuer via the payment processing network, and may similarly receive an authorization response message for the transaction from the issuer. If the authorization response message indicates that the issuer does not authorize the transaction (e.g., if the account does not contain sufficient funds), the consumer can be notified and the transaction canceled. If, however, the authorization response message indicates that the issuer has authorized the transaction, in accordance with the determined authentication process, the mobile access device may then prompt the consumer to provide the authentication information. Upon receipt, the mobile access device may verify the authentication information if it stores or otherwise has access to the known authentication information associated with the account. In other embodiments, if the issuer or payment processing network is used to authenticate the consumer, the mobile access device may transmit a separate message to the authenticating entity which can verify the authentication information and return an authentication response message. If the consumer is authenticated, the mobile merchant can release the purchased goods to the account holder. If the authenticating entity is unable to authenticate the consumer, the transaction can be canceled.

Embodiments of the invention can provide a number of advantages. The rules governing electronic payment transactions may vary from location to location. For example, in some jurisdictions, local requirements do not permit mobile merchants to request specified types of authentication information from consumers until after authorization of the transaction has been received from the issuer of the account used to conduct the transaction or from another entity that authorizes transactions on behalf of the issuer. In other jurisdictions, however, mobile merchants may be permitted to request the specified types of authentication information prior to submitting the transaction for authorization. Mobile merchants may be unaware of such regional authentication requirements. By determining the current location of a transaction at a mobile access device and selecting the appropriate authentication process to perform consistent with local requirements, embodiments of the invention may better equip mobile merchants to comply with the varying authentication requirements at many different locations.

Further, in instances where a mobile merchant is aware of the local requirements, the merchant may be unable to modify the authentication processes performed by their mobile access device. Moreover, even if the merchant's mobile access device is configured to allow for modifications to existing authentication processes, such manual adjustments can be time-consuming and may involve an inefficient use of an access device's processing resources and battery life. Embodiments of the invention may allow for dynamic and real-time adjustments to authentication processes in accordance with local requirements, in addition to more efficient use of mobile access device resources.

I. Exemplary Systems

FIG. 1 illustrates a block diagram of an exemplary payment processing system 100 in accordance with some embodiments. Although some of the entities and components in the system 100 are depicted as separate, in some instances, one or more of the components may be combined into a single device or location. Similarly, although certain functionality may be described as being performed by a single entity or component within the system 100, the functionality may in some instances be performed by multiple components and/or entities. Communication between entities and components may comprise the exchange of data or information using electronic messages and any suitable electronic communication medium and method, as described below.

As illustrated in FIG. 1, the system 100 may include one or more users, payment devices, mobile access devices, merchants, networks, gateways, acquirer computers, payment processing networks, and issuers computers. For example, as illustrated in FIG. 1, the system 100 can include a consumer 102 having a payment device 104. The consumer 102 can be an individual, an organization such as a business, or any other suitable entity capable of purchasing goods and/or services using the payment device 104.

The payment device 104 can be in any suitable form. For instance, a suitable payment device can be hand-held and compact so that it can fit into a wallet and/or pocket (e.g., pocket-sized) of the consumer 102. Exemplary payment devices may include, but are not limited to, smart cards, magnetic stripe cards, keychain devices (such as the Speedpass™ commercially available from Exxon-Mobil Corp.), smart media, transponders, 2-D barcodes, QR codes, and the like. If the payment device 104 is in the form of a smartcard or other payment card (e.g., a debit card, credit card, prepaid card, gift card, and the like), the payment device 104 may operate in a contact mode (e.g., using data stored on a magnetic stripe) and/or a contactless mode (e.g., using contactless circuitry and wireless communication such as NFC, Bluetooth, and the like).

The system 100 can further include a mobile access device 106 operated by a merchant 108. As used herein, a "merchant" may refer to an entity that engages in transactions and that can sell goods and/or services to consumers. In some embodiments, a merchant can be a "mobile merchant" that can sell goods and/or services at different locations. In some embodiments, a merchant can be a "stationary merchant" that can sell goods and/or services at a fixed location. The mobile access device 106 may be in any suitable form. Exemplary mobile access devices include, but are not limited to, mobile point of sale (POS) terminals, mobile phones (e.g., smart phones), PDAs, laptop computers, net books, tablet computers, media players, handheld specialized readers, and the like. The mobile access device 106 may use any suitable contact or contactless mode of operation to send or receive date from, or associated with, a payment device (e.g., the payment device 104). In some embodiments, where the mobile access device 106 comprises a mobile POS terminal, any suitable POS terminal may be used and may include a reader, a processor, and a computer-readable medium. Exemplary readers can include radio frequency (RF) antennas, optical scanners, bar code readers, QR code readers, and/or magnetic stripe readers configured to interact with a payment device such as the payment device 104. The mobile access device 106 can include an external communication interface such as a network interface for communicating with a gateway 112 or other entity illustrated in FIG. 1, system memory comprising one or more modules to generate and utilize electronic messages and perform other processes associated with location-specific authentication, and a data processor for facilitating financial transactions and the exchange of electronic messages. The components of the mobile access device 106, according to some embodiments, are described in further detail below with reference to FIG. 2.

The system 100 may further include an acquirer computer 114 operated by an acquirer. As used herein, an "acquirer" may refer to a business entity (e.g., a commercial bank or financial institution) that has a business relationship with a particular merchant or similar entity, and that facilitates clearing, settlement, and any other suitable aspect of electronic payment transactions. The acquirer computer 114 may include an external communication interface (e.g., for communicating with the gateway 112, a payment processing network 116, or other entity), system memory comprising one or more modules to generate and utilize electronic messages, and a data processor for facilitating financial transactions and the exchange of electronic messages.

The system 100 may further include an issuer computer 118 operated by an issuer. As used herein, an "issuer" may refer to a business entity (e.g., a bank or other financial institution) that maintains financial accounts for consumers and that may issue payment accounts and consumer payment devices (e.g., credit cards, debit cards, and the like) used to access funds of such accounts. Some entities may perform both issuer and acquirer functions. The issuer computer 118 may include an external communication interface (e.g., for communicating with the payment processing network 116 or other entity), system memory comprising one or more modules to generate and utilize electronic messages, and a data processor for facilitating financial transactions and the exchange of electronic messages.

The system 100 may further include the payment processing network 116, which may include data processing subsystems, networks, and operations used to support and deliver authorization services, exception file services, and clearing and settlement services. For instance, the payment processing network 116 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 116 may include an external communication interface (e.g., for communicating with the gateway 112, the acquirer computer 114, the issuer computer 118, or other entity), system memory comprising one or more modules to generate and utilize electronic messages, and a data processor for facilitating financial transactions and the exchange of electronic messages.

As shown in FIG. 1, the system 100 can further include the gateway 112. As used herein, a "gateway" can be any entity that provides services in support of electronic payment transactions. The gateway 112 may include an external communication interface (e.g., for communicating with the mobile access device 106, the acquirer computer 114, the payment processing network 116, or other entity), system memory comprising one or more modules to generate and utilize electronic messages, and a data processor for facilitating financial transactions and the exchange of electronic messages.

In some embodiments, the gateway 112 may provide additional services such as a hosted order page and/or silent order post. As used herein, a "hosted order page" (HOP) can be a third-party hosted webpage that accepts payment information from consumers (e.g., the consumer 102) on behalf of merchants (e.g., the merchant 108 operating the mobile access device 106). In some embodiments, the merchant's website may redirect a consumer to a HOP on a domain/server of the gateway 112 when the consumer 102 and/or merchant 108 selects a 'Buy' or 'Checkout' button from an online shopping cart (e.g., via an interface such as a touchscreen of the mobile access device 106). Once at the HOP, the consumer 102 and/or merchant 108 can input payment information (e.g., information associated with the payment device 104), such as credit card information. The gateway 112 can use the payment information entered by the consumer 102 to process the payment transaction for the merchant 108 so that the merchant 108 can avoid handling the consumer's payment information, and thereby avoid the cost and effort of complying with the Payment Card Industry Data Security Standard (PCI DSS) and government regulations regarding storing sensitive payment information. As used herein, a "silent order post" (SOP) may be akin to a HOP but with only the sensitive textboxes and other input controls being hosted by the gateway 112. That is, the merchant 108 can host the order page but the sensitive fields, such as the credit card number and expiration date entry textboxes, can be posted only at the gateway 112.

In some embodiments, to conduct a purchase transaction, the consumer 102 and/or merchant 108 may cause the payment device 104 to interact with the mobile access device 108 (e.g., by swiping or scanning). Account information associated with the payment device 104 can then be transmitted by the mobile access device 106 to the gateway 112. In some embodiments, the mobile access device 106 and gateway 112 can communicate using a network 110 which may be any suitable communication network such as the Internet, a voice network, and/or a data network. Any suitable communication protocol can be used including, but not limited to, WiFi (IEEE 802.11 family standards), 3G, 4G EDGE, and the like.

Many of the data processing functions and features of some embodiments of the invention may be present in the mobile access device 106. It should be understood, however, that such functions and features could be present in other components of the system 100 in some embodiments, such as the gateway 112, payment processing network 116, or other entity, and need not be present in the mobile access device 106.

The mobile access device 106, gateway 112, acquirer computer 114, payment processing network 116, and issuer computer 118 may all be in operative communication with each other. For example, as described above, some or all of these components of the system 100 can include an external communication interface. As used herein, an "external communication interface" may refer to any hardware and/or software that enables data to be transferred between two or more components of the system 100 (e.g., between devices residing at locations such as an issuer, acquirer, merchant, payment processing network, gateway etc.). Some examples of external communication interfaces may include a modem, a network interface (such as an Ethernet card), a communications port, a Personal Computer Memory Card International Association (PCMCIA) slot and card, and the like. Data transferred via an external communications interface may be in the form of signals which may be electrical, electromagnetic, optical, or any other signal capable of being received by the external communications interface (collectively referred to as "electronic signals" or "electronic messages"). These electronic messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable method.

As would be understood by one of ordinary skill in the art, any suitable communications protocol for storing, representing, and transmitting data between components of the system 100 may be used. Some examples of such methods may include utilizing predefined and static fields (such as in core TCP/IP protocols); "Field: Value" pairs (e.g., HTTP, HTTPS, FTP, SMTP, POP3, and SIP); an XML based format; and/or Tag-Length-Value format.

In some embodiments, the payment device 104 can be a mobile device such as a mobile phone (e.g., smart phone), tablet computer, PDA, net book, laptop computer, media player, or the like. The payment device 104 may facilitate an "electronic" or "digital wallet" that may be used to conduct an electronic payment transaction. In such embodiments, an electronic wallet server (not shown) may be in operational communication with the mobile access device 106, gateway 112, payment processing network 116, and/or other entity, and may maintain an association between the consumer's digital wallet and one or more payment accounts (e.g., credit, debit, prepaid accounts, and the like). An electronic wallet server can provide a web interface (e.g. through one or more web pages) to receive and transmit requests for payment services and/or may provide an application program interface (API) on the payment device 104 to provide the web service.

A description of a typical electronic transaction flow using the system 100 may be helpful in understanding embodiments of the invention. As an initial step, the consumer 102 can attempt to purchase goods and/or services from the merchant 108. This may involve the consumer 102 presenting the payment device 104 (e.g., a credit card) to the merchant 108, which may swipe or otherwise cause the payment device 104 to interact with the mobile access device 106. The mobile access device 106 can then generate an authorization request message for the transaction, and can transmit this message to the gateway 112 via the network 110. The gateway 112 can then transmit the authorization request message to the payment processing network 116 which may forward the message to the issuer computer 118 operated by the issuer of the account associated with the payment device 104.

Upon receipt of the authorization request message, the issuer computer 118 can perform a number of processes (e.g., verifying the account, confirming that the account has a sufficient balance or available credit to cover the amount of the transaction, consumer fraud detection, and/or other processes) to determine whether to authorize the transaction. In some embodiments, when the mobile access device 106 prompts the user for authentication data (e.g., a billing ZIP code associated with the payment device 104), this authentication data can be included in the authorization request message so that the issuer computer 118 or other entity can authenticate the consumer 102. After making an authorization decision (and an authentication decision in some embodiments), an authorization response message is generated by the issuer computer 118 including an indication of the authorization decision, and is transmitted by the issuer computer 118 to the gateway 112 via the payment processing network 116. The gateway 112 may store a record of the authorization decision and can then forward the authorization response message to the mobile access device 106 via the network 110. The mobile access device 106 may then provide an indication to the consumer 102 and/or merchant 108 whether authorization of the transaction has been approved or declined by the issuer. In some embodiments, this may involve displaying an indication of the authorization decision on a display of the mobile access device 106.

In some embodiments, as described in further detail below, the authentication process can be performed after the transaction has been authorized by the issuer computer 118. In such embodiments, after the mobile access device 106 receives the authorization response message approving the transaction from the gateway 112, the mobile access device 106 can prompt the consumer 102 to provide the authentication data. Upon receipt of the authentication data, the mobile access device 106 may either verify the authentication data by comparing it to stored or otherwise accessible known authentication data associated with the payment device 104, or may transmit the received authentication data to another entity in the system 100 which verify the authentication data and provide a response to the mobile access device 106. Upon authentication of the consumer 102, an indication that the transaction has been approved can be provided to the consumer 102 and/or merchant 108 by the mobile access device 106 (e.g., via a display).

At the end of the day, if the transaction was authorized and authenticated, a clearing and settlement process can be conducted by the gateway 112. A clearing process may include the exchange of financial details between the acquirer computer 114 and the issuer computer 118 across the payment processing network 116 to facilitate posting to the consumer's account and reconciliation of the settlement position. A settlement process may include the actual transfer of funds from the issuer computer 118 to the acquirer computer 114. In some embodiments, to initiate settlement, the gateway 112 can transmit a settlement file including an approval code for the transaction (along with other approved transactions in a batch format) to the payment processing network 116 which can then communicate with the issuer computer 118 and the acquirer computer 114 to facilitate the transfer of funds.

Figure 2:
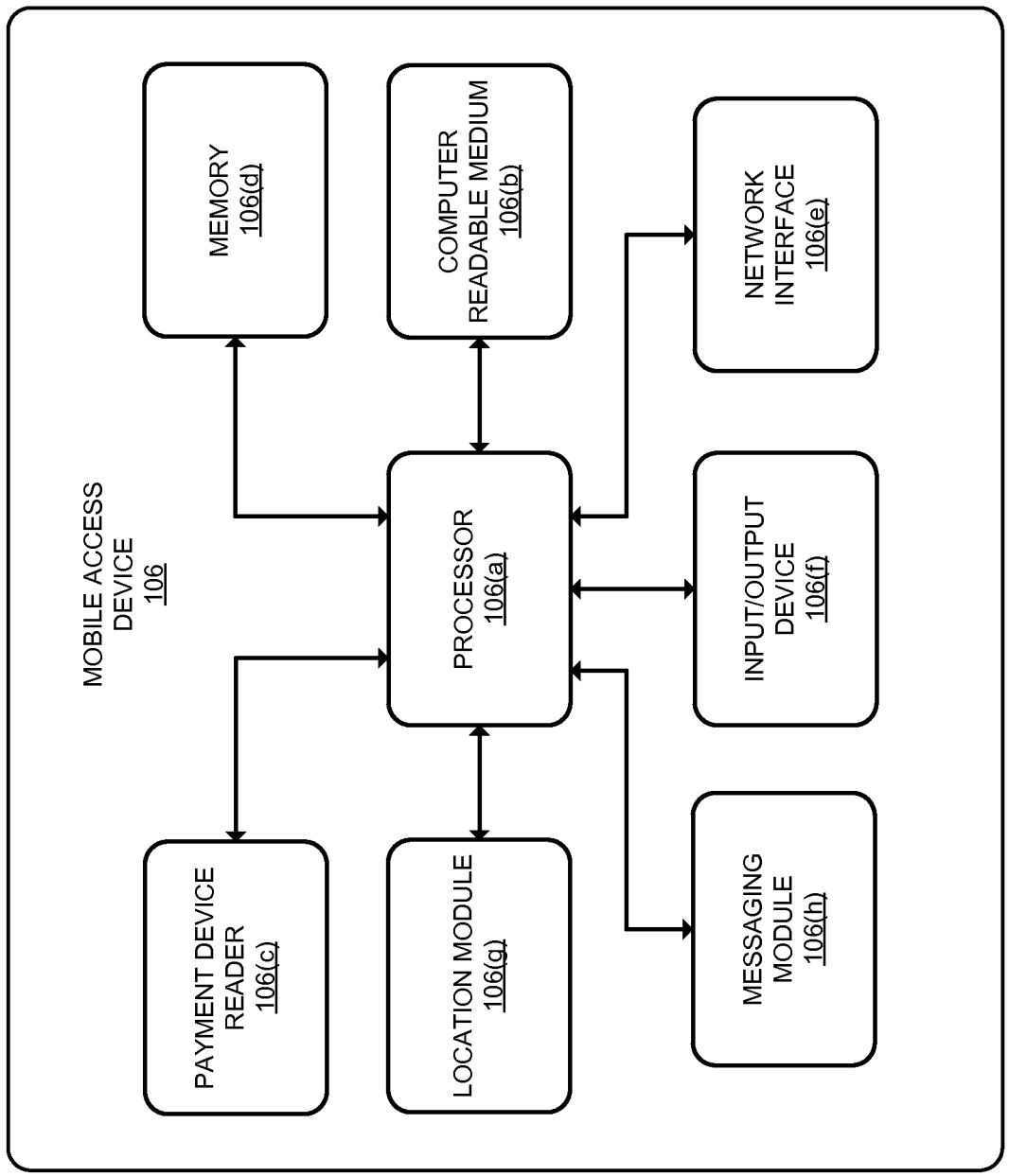
FIG. 2 illustrates a block diagram of an exemplary mobile access device in accordance with some embodiments.

FIG. 2 illustrates a block diagram of an exemplary mobile access device 106 in accordance with some embodiments. The exemplary mobile access device 106 is illustrated as comprising a plurality of hardware and software modules (106(a)-106(h)). However, it should be appreciated that this is provided for illustration purposes only, and each of the modules and associated functionality may be provided and/or performed by the same or different components. That is, the mobile access device 106 may, for example, perform some of the relevant functions and steps described herein through the use of any suitable combination of software instructions and/or hardware configurations. It should be noted that although FIG. 2 illustrates all of the modules located on a single device, the disclosure is not meant to be so limited. Moreover, a system for implementing the functionality described herein may have additional components or less than all of these components. Additionally, some modules may be located on other devices such as a remote server or other local devices that are functionally connected to the mobile access device component(s).

The mobile access device 106 is shown as comprising a processor 106(a), and a computer readable medium 106(b) and system memory 106(d) operatively coupled to the processor 106(a). The processor 106(a) can carry out instructions embodied as code in the computer readable medium 106(b) and/or system memory 106(d). The processor 106(a) can be a central processing unit (CPU). Exemplary processors include, but are not limited to, a single-core processor, a plurality of single-core processors, a multi-core processor, a plurality of multi-core processors, or any other suitable combination of hardware configured to perform arithmetical, logical, and/or input/output operations of the mobile access device 106. The computer readable medium 106(b) and system memory 106(d) may comprise any combination of volatile and/or non-volatile memory such as, for example, buffer memory, RAM, DRAM, ROM, flash, disk drives, or any other suitable storage media. In some embodiments, one or more of the software and/or hardware modules illustrated in FIG. 2 (e.g., location module 106(g), messaging module 106(h), etc.) may be stored on the computer readable medium 106(b) and/or system memory 106(d).

The mobile access device 106 may further comprise a payment device reader 106(c), a network interface 106(e), an input/output device 106(f), a location module 106(g), and a messaging module 106(h), each operatively coupled to the processor 106(a). A housing may house one or more of the components illustrated in FIG. 2.

The payment device reader 106(c) may be configured or programmed to perform some or all of the functionality associated with interacting with payment devices (e.g., receiving account information). The payment device reader 106(c) may include one or more radio frequency (RF) antennas, optical scanners, bar code readers, QR code readers, NFC readers, magnetic stripe readers, and/or the like, configured to interact with payment devices (e.g., payment device 104).

The input/output device 106(f) may be configured or programmed to perform some or all of the functionality associated with providing output and receiving input. The output device 106(f) may include a display and/or an audio output device such as one or more speakers. In some embodiments, the input/output device 106(f) includes buttons or other input elements to allow input to be provided to the mobile access device 106. In some embodiments, the input/output device may include a touchscreen that may operate to both receive input and provide visual output.

The location module 106(g) may be configured or programmed to perform some or all the functionality associated with determining a current location of the mobile access device 106. For example, the location module 106(g) may utilize a Global Positioning System (GPS), cellular phone tower triangulation data, cellular phone tower signal strength data, wireless access point location data, an Internet Protocol (IP) address, or any other suitable means for determining a location of the mobile access device 106.

The messaging module 106(h) may be configured or programmed to perform some or all the functionality associated with exchanging and analyzing authorization message and, in some embodiments, authentication messages. The messaging module 106(h) can exchange such messages with any suitable entity in the system 100 by way of the network interface 106(e). For example, the messaging module can generate an authorization request message for a transaction, receive an authorization response message for the transaction (e.g., from the issuer computer 118 via payment processing network 116 and/or gateway 112), and can provide an indication of the authorization decision using the input/output device 106(f). In some embodiments, the messaging module 106(h) can perform (or assist with) authentication of the transaction by requesting authentication data from the consumer 102 (e.g., using input/output device 106(f)). In some embodiments, the messaging module 106(h) can verify authentication data received from the consumer 102 by comparison to known verification data stored on the computer readable medium 106(b) or otherwise accessible to the mobile access device 106 (e.g., via network interface 106(e)). In some embodiments, where authentication is performed by another entity in the system 100, the messaging module 106(h) may transmit authentication data received from the consumer 102 as an authentication request message, and may be configured to receive an authentication response message from the authenticating entity (e.g., via network interface 106(e)). In some embodiments, all or part of these authentication processes can be performed by a separate authentication module (not shown).

In some embodiments, the messaging module 106(h) can be configured to select an appropriate authentication process for a given transaction based on the current location of the mobile access device 106. For example, a transaction can be initiated when the consumer 102 causes their payment device 104 to interact with the payment device reader 106(c). In response, the location module 106(g) can determine the current location of the mobile access device 106, and can pass this information to the messaging module 106(h). The messaging module 106(h) may then identify the appropriate authentication process for the current location by, for example, comparing the determined location with a data table stored in the computer readable medium 106(b). In some embodiments, all or part of these authentication process selection steps can be performed by a separate authentication process selection module (not shown).

FIG. 3 illustrates an exemplary data table 300 containing location-specific authentication rules 302 in accordance with some embodiments. As shown in FIG. 3, the authentication rules 302 can include relational data fields containing data representing authentication rules including, but not limited to, specified locations 302(a) and corresponding authentication processes 302(b) that may be permitted at the specified locations 302(a). The locations 302(a) may be represented by geographic coordinates, street addresses, towns, cities, states, countries, and/or the like. The authentication processes 302(b) can include any suitable location-specific authentication processes. In some embodiments, as illustrated in FIG. 3, the authentication processes can include instructions to request authentication data before authorization of a transaction or after authorization. In some embodiments, the data table 300 may include populated fields identifying the particular types of authentication data that may be requested at the given location before and/or after authorization of the transaction.

It should be noted that the arrangement and content of fields shown in the data table 300 are provided only as an illustration. Data tables according to embodiments of the invention may include any suitable number of fields including fewer or more fields than that shown in the data table 300 and/or different data fields altogether. Embodiments of the invention may alternatively include other arrangements of data different than the relational data fields illustrated in FIG. 3.

In FIG. 3, the data table 300 is illustrated as being contained in the computer readable medium 106(b). This, however, is not intended to be limiting. In some embodiments, authentication rules may be stored on a remote storage device (e.g., a web-based database) accessible to the mobile access device 106 via the network interface 106(e).

II. Exemplary Methods

Figure 4:
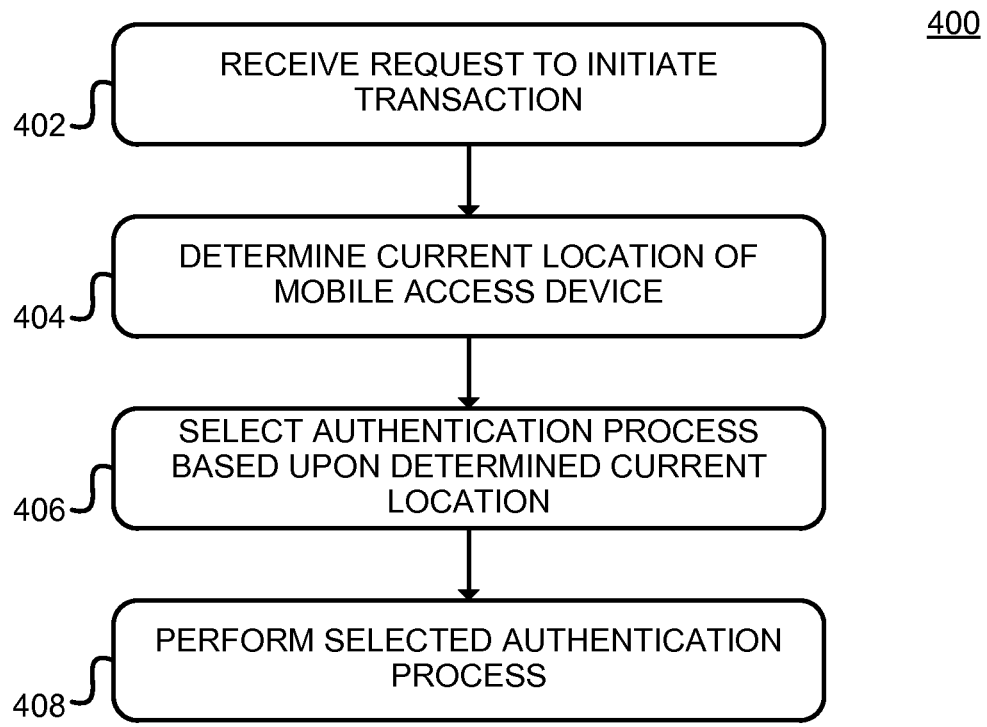
FIG. 4 illustrates a flowchart of an exemplary method of providing location-specific authentication at a mobile access device in accordance with some embodiments.

FIG. 4 illustrates a flowchart of an exemplary method 400 of providing location-specific authentication at a mobile access device in accordance with some embodiments. The steps of the method 400 may be performed, for example, by the mobile access device 106. In other embodiments, one or more steps of the method 400 may be performed by any other suitable entity such as one or more of the entities of the system 100 shown in FIG. 1. In some embodiments, one or more steps of the method 400 may be performed by an entity not shown FIG. 1, such as a merchant processor, issuer processor, acquirer processor, or any other suitable entity.

In FIG. 4, at step 402, a mobile access device may receive a request to initiate a transaction. In some embodiments, the request may comprise input provided by a merchant or consumer to the mobile access device, the input including information about the transaction such as the goods or services being sold, a transaction amount, and the like. In some embodiments, the request may comprise an interaction with a payment device such as a swipe or scan of the payment device at the mobile access device.

At step 404, the mobile access device can determine the current location of the mobile access device. In some embodiments, determining the current location of the mobile access device includes determining that the current location of the mobile access device is a first location or a second location, the second location being different than the first location. The current location of the mobile device can be determined in any suitable manner including, for example, using a Global Positioning System (GPS), cellular phone tower triangulation data, cellular phone tower signal strength data, wireless access point location data, an Internet Protocol (IP) address, or any other suitable means for determining a location of the mobile access device. The determined location of the mobile access device can be any suitable indication of geographic location including, but not limited to, geographic coordinates, street address, city, state, country, and the like.

At step 406, the mobile access device can select an authentication process based upon the determined current location of the mobile access device. In some embodiments, the selected authentication process is a first authentication process when the determined current location is the first location, and the selected authentication process is a second authentication process when the determined current location is the second location, the second authentication process being different than the first authentication process. In some embodiments, the authentication process is selected based on location-specific authentication rules stored at the mobile access device. In some other embodiments, all or a portion of the authentication rules are stored at a remote location (e.g., a web-based database) accessible to the mobile access device.

At step 408, the mobile access device can perform the selected authentication process. In some embodiments, performing the first authentication process comprises requesting authentication data before authorization of the transaction, and performing the second authentication process comprises requesting the authentication data after authorization of the transaction. In some embodiments, performing the first authentication process comprises requesting a signature from the consumer, and performing the second authorization process comprises not requesting the signature from the consumer. Any suitable type of authentication data may be requested. For example, in some embodiments, the requested authentication data can include a ZIP code, billing address, email address, phone number, Personal Identification Number (PIN), signature, password, passphrase, CVV code, date of birth, or biometric data. In some embodiments, performing the first authentication process comprises encrypting account data and/or authentication data in accordance with a first encryption protocol, and performing the second authentication process comprises encrypting the account data and/or authentication data in accordance with a second encryption protocol, the second encryption protocol being different than the first encryption protocol.

In some embodiments, authorization of the transaction can comprise transmitting, by the mobile access device, an authorization request message for the transaction, and receiving, by the mobile access device, an authorization response message for the transaction. In some embodiments, the authorization request message can be transmitted to an issuer of an account used to conduct the transaction via a payment processing network configured to process credit and debit card transactions, and the authorization response message can be received from the issuer via the payment processing network. In some embodiments, another entity such as a gateway or the payment processing network may perform authorization on behalf of the issuer. In such embodiments, an authorization response message may be generated by the authorizing entity such that the authorization request message is not transmitted to the issuer of the account.

The requested authentication data can be received by the mobile access device. For example, the consumer can provide the authentication data using one or more buttons, a touchscreen, or other input device of the mobile access device. In some embodiments, the requested authentication data can be transmitted by the mobile access device to the issuer via the payment processing, and the mobile access device can receive an indication whether the transaction is authenticated from the issuer via the payment processing network.

In some embodiments, transmitting the requested authentication data can comprise inserting the requested authentication data into the authorization request message transmitted to the issuer via the payment processing network, and receiving the indication whether the transaction is authenticated can comprise receiving the authorization response message from the issuer via the payment processing network, the received authorization response message including the indication. In some embodiments, another entity such as the gateway or payment processing network may perform authentication of the transaction. In such embodiments, an authentication response message may be received from the other entity indicating whether the transaction is authenticated. In some embodiments, the mobile access device may store or otherwise have access to known authentication data that may be used to authenticate the transaction without communicating the authentication data to the issuer or other entity.

Figure 5:
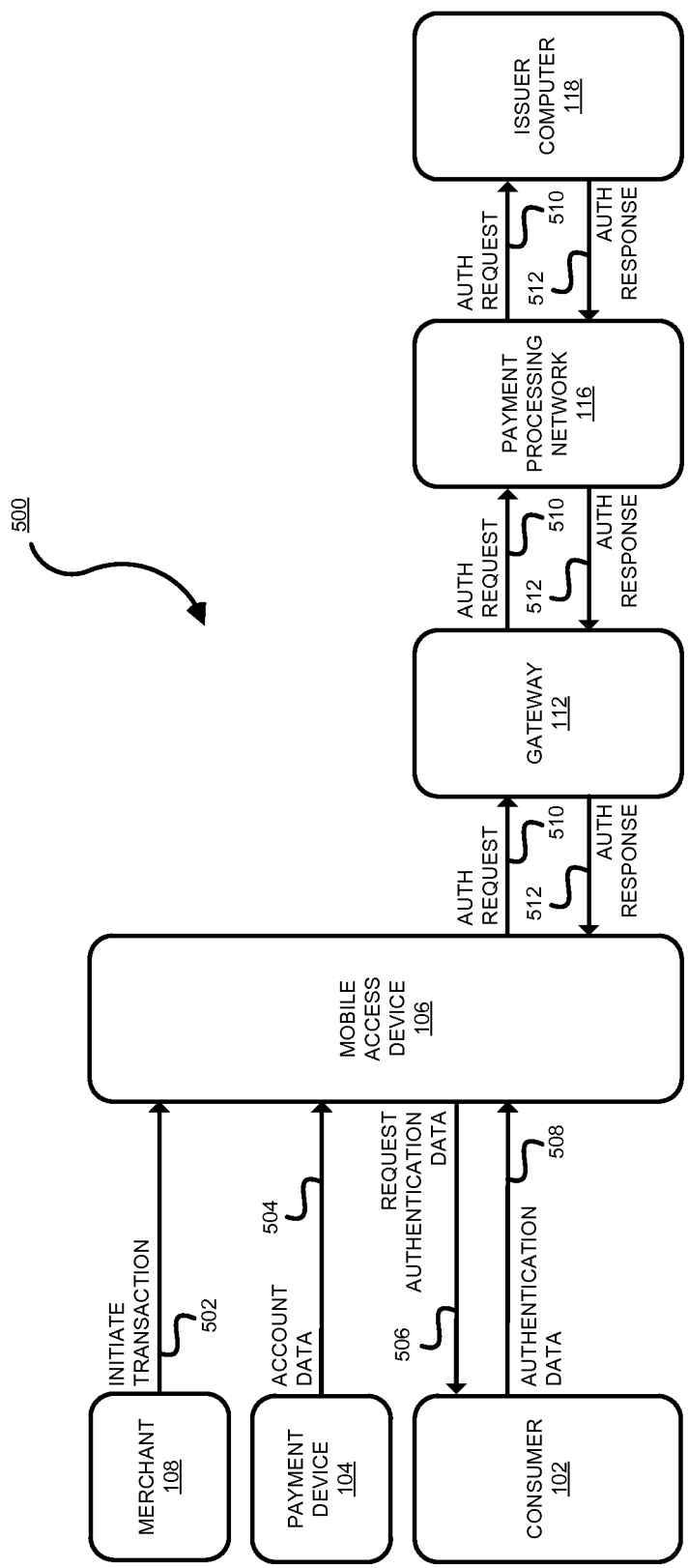
FIGS. 5-6 illustrate block diagrams of an exemplary system and corresponding workflows for providing location-specific authentication at a mobile access device in accordance with some embodiments.

FIG. 5 illustrates a block diagram of an exemplary system and corresponding workflow 500 for providing location-specific authentication at a mobile access device in accordance with some embodiments. As illustrated in FIG. 5, the system may include components of the system 100 shown in FIG. 1, such as the consumer 102, payment device 104, merchant 108, mobile access device 106, gateway 112, payment processing network 116, and issuer computer 118.

As a non-limiting illustration using the system and workflow 500 shown in FIG. 5, the merchant 108 may initiate a transaction with the consumer 102 by providing input 502 to the mobile access device 106. For example, the merchant 108 may provide input via a touchscreen of the mobile access device 106 initiating a transaction for the purchase of goods, the input indicating the goods being sold, a purchase amount, and other information in some embodiments. The payment device—a debit card in this illustration—is then swiped or scanned at the mobile access device 106 such that account data 504 is received by the mobile access device 106. The account data 504 may include, for example, the consumer's name, primary account number, expiration data, and other information used to process the transaction. The mobile access device 106 may be further configured to request and receive a billing ZIP code from the consumer 102 for authenticating the transaction.

In the illustrative workflow 500 shown in FIG. 5, the mobile access device 106 determines (e.g., using GPS) that its current location allows consumer ZIP codes to be obtained for authentication purposes prior to transaction authorization. Upon making this determination, the mobile access device 106 can provide (e.g., display) a request 506 that prompts the consumer 102 for their billing ZIP code. In response, the consumer 102 may provide their billing ZIP code to the mobile access device by, for example, input 508 on the touchscreen of the mobile access device 106.

Upon receipt of the consumer's billing ZIP code, the mobile access device 106 can generate an authorization request message 510 including information such as the consumer's name, the debit account number, expiration date, purchase amount, the billing ZIP code, and other information used to process the transaction. As shown in FIG. 5, the authorization request message 510 can be transmitted from the mobile access device 106 to the gateway 112 (e.g., via network 110 shown in FIG. 1), from the gateway 112 to the payment processing network 116, and from the payment processing network 116 to the issuer computer 118. The issuer computer can then authenticate the consumer 102 by comparing the received billing ZIP code to a ZIP code stored on file for the debit account, and can perform various steps to authorize the transaction such as confirming that the debit account contains sufficient funds to cover the purchase amount, performing fraud detection processes, etc.

After performing authentication and authorization of the transaction, the issuer computer 118 may generate an authorization response message 512 that is routed to the payment processing network 116, from the payment processing network 116 to the gateway 112, and from the gateway 112 back to the mobile access device 106 (e.g., via network 110). The mobile access device 106 may then provide an indication to the consumer 102 and merchant 108 whether the transaction has been approved.

Figure 6:
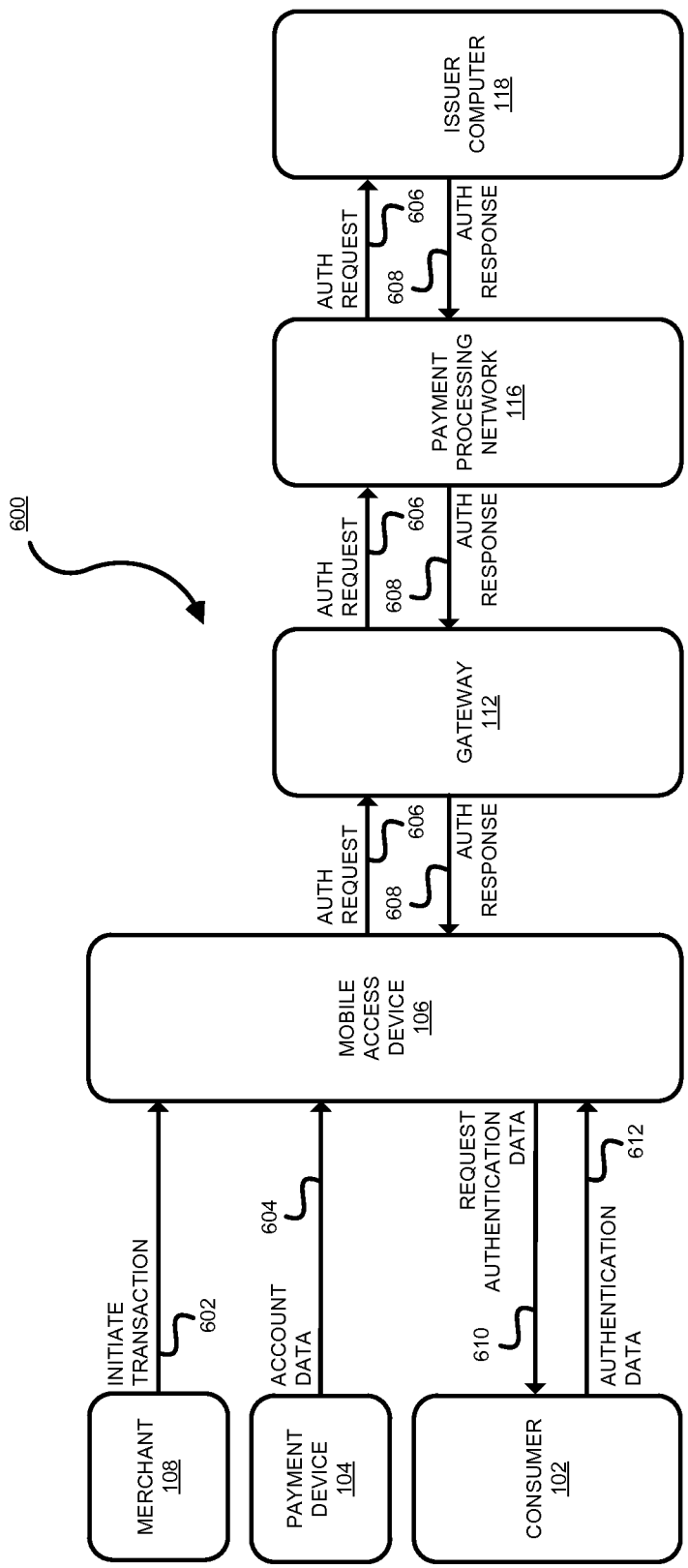

FIG. 6 illustrates a block diagram of an exemplary system and corresponding workflow 600 for providing location-specific authentication at a mobile access device in accordance with some embodiments. As illustrated in FIG. 6, the workflow 600 is implemented using the same system shown in FIG. 5 including the consumer 102, payment device 104, merchant 108, mobile access device 106, gateway 112, payment processing network 116, and issuer computer 118 from the system 100 of FIG. 1.

As a non-limiting illustration using the system and workflow 600 shown in FIG. 6, the merchant 108 may initiate a transaction with the consumer 102 by providing input 602 to the mobile access device 106. For example, the merchant 108 may provide input via a touchscreen of the mobile access device 106 initiating a transaction for the purchase of goods, the input indicating the goods being sold, a purchase amount, and other information in some embodiments. The payment device—a credit card in this illustration—is then swiped or scanned at the mobile access device 106 such account data 604 is received by the mobile access device 106. The account data 604 may include, for example, the consumer's name, primary account number, expiration data, and other information used to process the transaction. As with workflow 500, the mobile access device 106 in this illustration may also be configured to request and receive a billing ZIP code from the consumer 102 for authenticating the transaction.

In contrast to the workflow 500 illustrated in FIG. 5, however, in the workflow 600 the mobile access device 106 determines that its current location does not permit consumer ZIP codes to be obtained for authentication purposes prior to transaction authorization. Thus, in this illustration, the mobile access device 106 may only request the billing ZIP code from the consumer 102 if and when the issuer computer 118 authorizes the transaction.

The mobile access device 106 can then generate an authorization request message 606 including information such as the consumer's name, the credit account number, expiration date, purchase amount, and other information used to process the transaction excluding the billing ZIP code. As with the workflow 500, the authorization request message 606 in the workflow 600 can be transmitted from the mobile access device 106 to the gateway 112 (e.g., via network 110 shown in FIG. 1), from the gateway 112 to the payment processing network 116, and from the payment processing network 116 to the issuer computer 118. The issuer computer can then perform various steps to authorize the transaction such as confirming that the credit card account contains sufficient funds to cover the purchase amount, performing fraud detection processes, etc.

After performing authorization of the transaction, the issuer computer 118 may generate an authorization response message 608 that is routed to the payment processing network 116, from the payment processing network 116 to the gateway 112, and from the gateway 112 back to the mobile access device 106 (e.g., via network 110). If the authorization response message 608 indicates that the issuer computer 118 has declined authorization of the transaction, the transaction may be canceled. If, however, the authorization response message 608 indicates issuer authorization, the mobile access device 106 may provide (e.g., display) a request 610 that prompts the consumer 102 for their billing ZIP code. In response, the consumer 102 may provide their billing ZIP code to the mobile access device 106 by, for example, input 612 on the touchscreen of the mobile access device 106.

Authentication of the consumer may then be performed by, for example, comparing the billing ZIP code received from the consumer 102 with a stored ZIP code associated with the credit card account. If the mobile access device 106 has access to the stored ZIP code, authentication of the consumer 102 can be performed by the mobile access device 106. Alternatively, the mobile access device 106 may transmit an authentication request message (not shown) including the billing ZIP code received from the consumer 102 to the gateway, payment processing network 116, issuer computer 118, or other entity for authentication. The authenticating entity can then transmit an authentication response message (not shown) back to the mobile access device 106 indicating whether the consumer 102 has been authenticated. If the consumer 102 is not authenticated, the transaction can be canceled. If, however, authentication of the consumer 102 is successful, the transaction can be completed and the purchased goods released by the merchant 108 to the consumer 102.

Many functionalities in accordance with embodiments of the invention are described herein as being implemented by a mobile access device operated by a merchant. This, however, is not intended to be limiting. In some embodiments, one or more of the functionalities may be performed by a user device (e.g., a payment device) operated by a consumer. For example, if the payment device is a mobile device with digital wallet capabilities, the payment device may be configured to determine its current location, select an authentication process based on the determined location, and/or perform the authentication process, in the context of an electronic payment transaction. A user device may also perform such functionality in the context of an e-commerce transaction.

In some embodiments, authentication processes permitted at a given location may depend on the transaction environment. For example, in a "card present" transaction, the consumer can be in proximity to the merchant such that the consumer's payment device interacts with the merchant's mobile access device to conduct the transaction. In another example, in a "customer facing transaction," the consumer may conduct the transaction with the merchant without being in proximity to the merchant such as in an e-commerce transaction. Since authentication requirements may depend on whether the transaction is a card present or customer facing transaction, the locations of both the consumer and the merchant can be determined in some embodiments. For example, as described herein, the location of the merchant can be obtained by determining the current location of the merchant's mobile access device. The customer's payment device can also include location-determination capabilities in some embodiments, such capabilities being used to determine the current location of the payment device and thus the customer's location. If the determined locations are the same or similar, this can indicate a card present transaction and, if the merchant and customer are beyond a threshold distance away from each other, this can indicate a customer facing transaction. The authentication process selected upon determining the transaction environment may be based on the determined location of the consumer and/or the determined location of the merchant.

III. Exemplary Computer Apparatus

The various participants and elements described herein with reference to FIGS. 1-6 may operate one or more computer apparatus to facilitate the functions described herein. Any of the elements in FIGS. 1-6 may use any suitable number of subsystems to facilitate the functions described herein.

Figure 7:
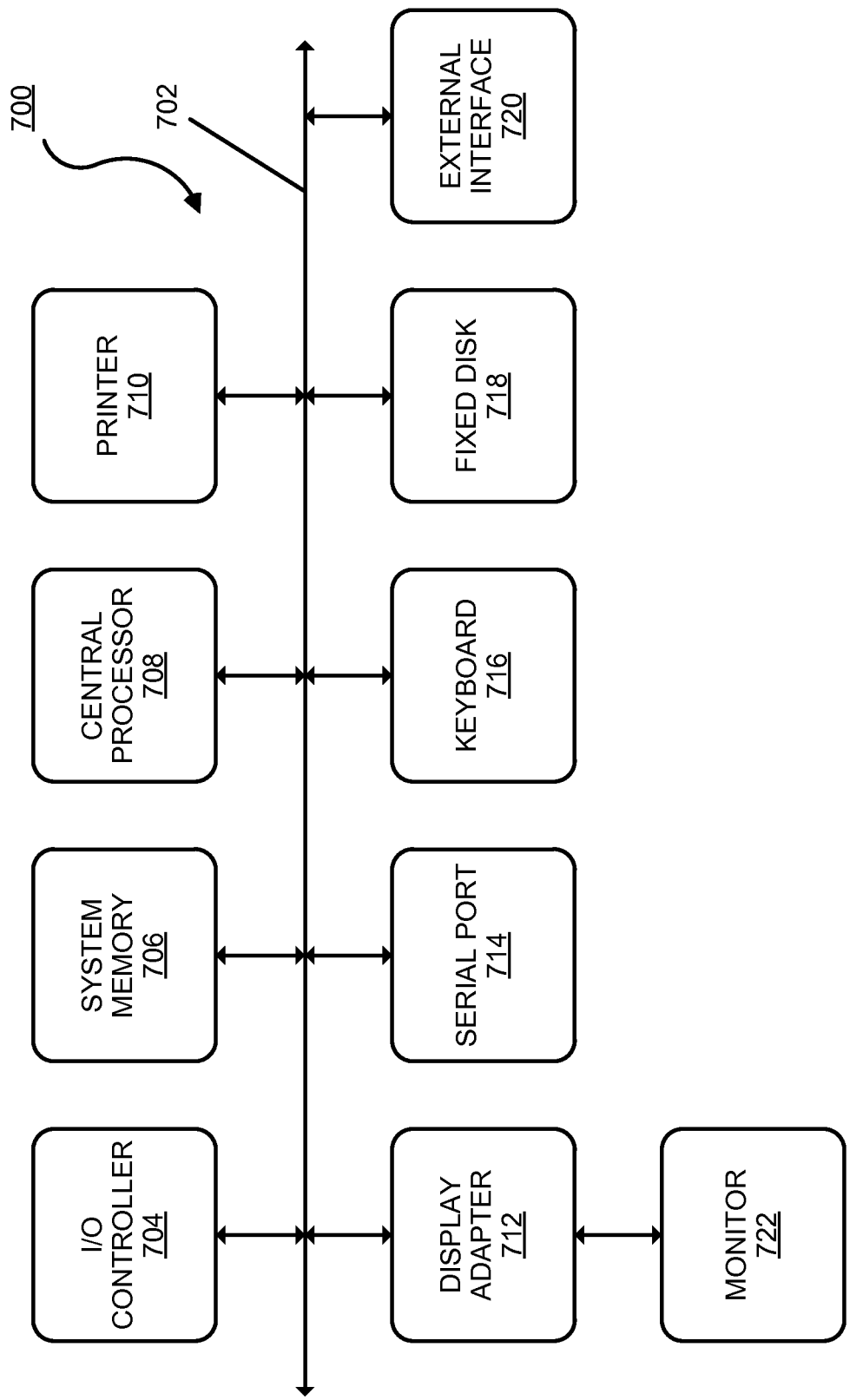
FIG. 7 illustrates a block diagram of an exemplary computer apparatus in accordance with some embodiments.

Examples of such subsystems or components are shown in FIG. 7 which illustrates exemplary computer apparatus 700. The subsystems shown in FIG. 7 are interconnected via a system bus 702. Additional subsystems such as a printer 710, keyboard 716, fixed disk 718 (or other memory comprising computer readable media), monitor 722, which is coupled to a display adapter 712, and others are shown. Peripherals and input/output (I/O) devices, which couple to I/O controller 704 (which can be a processor or other suitable controller), can be connected to the computer system by any number of means known in the art, such as a serial port 714. For instance, serial port 714 or an external interface 720 can be used to connect computer apparatus 700 to a wide area network such as the Internet, a mouse input device, or a scanner. The interconnection via system bus 702 allows a central processor 708 to communicate with each subsystem and to control the execution of instructions from a system memory 706 or fixed disk 718, as well as the exchange of information between subsystems. System memory 706 and/or fixed disk 718 may embody a computer readable medium (e.g., a non-transitory computer readable medium).

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
receiving, by a mobile access device, a request to initiate a transaction conducted by a user at a current location;
determining, based on the transaction, a set of user authentication data needed to conduct the transaction;
determining, by the mobile access device, a current location of the mobile access device;
selecting, by the mobile access device, an authentication process based upon the determined current location of the mobile access device, wherein the authentication process pertains to transactions originating at the current location;
determining, based on the selected authentication process, a first subset of the set of user authentication data and a second subset of the set of user authentication data, the first subset of the set of user authentication data including a first portion of the set of user authentication data and the second subset of user authentication data including a remaining portion of the set of user authentication data;
performing, by the mobile access device, the selected authentication process by:
obtaining values for the first subset of user authentication data;
transmitting an authorization request message for the transaction that includes the values for the first subset of user authentication data to an issuer via a payment processing network;
upon receiving an authorization response message for the transaction from the issuer, obtaining values for the second subset of user authentication data; and
subsequent to receiving the authorization response, verifying the values for the second subset of user authentication data by:
generating an authentication request that includes the second subset of user authentication data; and
providing the authentication request to the payment processing network; and
completing the transaction only if the authorization response message indicates authorization of the transaction and the values for the second subset of user authentication data are verified.

2. The method of claim 1, wherein determining the current location of the mobile access device includes determining that the current location is a first location or a second location, the second location being different than the first location.

3. The method of claim 2, wherein the selected authentication process is a first authentication process when the determined current location is the first location, and wherein the selected authentication process is a second authentication process when the determined current location is the second location, the second authentication process being different than the first authentication process.

4. The method of claim 1, wherein the authorization request message is transmitted to an issuer of an account used to conduct the transaction via a payment processing network configured to process credit and debit card transactions, and wherein the authorization response message is received from the issuer via the payment processing network.

5. The method of claim 1, wherein the first subset of user authentication data or the second subset of user authentication data includes one or more member selected from the group consisting of: a Zone Improvement Plan (ZIP) code, billing address, email address, phone number, Personal Identification Number (PIN), signature, password, passphrase, CVV code, date of birth, and biometric data.

6. The method of claim 1, wherein the first subset of user authentication data or the second subset of user authentication data includes a Zone Improvement Plan (ZIP) code.

7. A mobile access device comprising:
a processor; and
a non-transitory computer-readable medium coupled to the processor, the computer-readable medium including code executable by the processor for performing a method comprising:
receiving a request to initiate a transaction conducted by a user at a current location;
determining, based on the transaction, a set of user authentication data needed to conduct the transaction;
determining a current location of the mobile access device;
selecting an authentication process based upon the determined current location of the mobile access device, wherein the authentication process pertains to transactions originating at the current location;
determining, based on the selected authentication process, a first subset of the set of user authentication data and a second subset of the set of user authentication data, the first subset of the set of user authentication data including a first portion of the set of user authentication data and the second subset of user authentication data including a remaining portion of the set of user authentication data;
performing the selected authentication process by:
obtaining values for the first subset of user authentication data;
transmitting an authorization request message for the transaction that includes the values for the first subset of user authentication data to an issuer via a payment processing network;
upon receiving an authorization response message for the transaction from the issuer, obtaining values for the second subset of user authentication data; and
subsequent to receiving the authorization response, verifying the values for the second subset of user authentication data by:
generating an authentication request that includes the second subset of user authentication data; and
providing the authentication request to the payment processing network; and
completing the transaction only if the authorization response message indicates authorization of the transaction and the values for the second subset of user authentication data are verified.

8. The mobile access device of claim 7, wherein determining the current location of the mobile access device includes determining that the current location is a first location or a second location, the second location being different than the first location.

9. The mobile access device of claim 8, wherein the selected authentication process is a first authentication process when the determined current location is the first location, and wherein the selected authentication process is a second authentication process when the determined current location is the second location, the second authentication process being different than the first authentication process.

10. The mobile access device of claim 7, wherein the authorization request message is transmitted to an issuer of an account used to conduct the transaction via a payment processing network configured to process credit and debit card transactions, and wherein the authorization response message is received from the issuer via the payment processing network.

11. The mobile access device of claim 7, wherein first subset of user authentication data or the second subset of user authentication data includes one or more member selected from the group consisting of: a Zone Improvement Plan (ZIP) code, billing address, email address, phone number, Personal Identification Number (PIN), signature, password, passphrase, CVV code, date of birth, and biometric data.

12. The mobile access device of claim 7, wherein the first subset of authentication data or the second subset of user authentication data includes a Zone Improvement Plan (ZIP) code.

* * * * *